United States Patent [19]

Triolo

[11] 4,153,589

[45] May 8, 1979

[54] THERMOPLASTIC ELASTOMERIC MOLDING COMPOSITION AND ARTICLES MOLDED THEREFROM

[75] Inventor: Louis J. Triolo, Hasbrouck Heights, N.J.

[73] Assignee: Amerace Corporation, New York, N.Y.

[21] Appl. No.: 799,842

[22] Filed: May 23, 1977

Related U.S. Application Data

[63] Continuation of Ser. No. 635,698, Nov. 26, 1975, abandoned.

[51] Int. Cl.² ............................................. C08L 91/00
[52] U.S. Cl. ........................... 260/28.5 B; 260/28.5 A; 260/33.6 AQ; 260/42.47
[58] Field of Search ................ 260/33.6 AQ, 318 DR, 260/42.47, 28.5 A, 28.5 B, 897 A

[56] References Cited

U.S. PATENT DOCUMENTS

| | | | |
|---|---|---|---|
| 3,324,229 | 6/1967 | Ingmanson | 260/42.47 X |
| 3,400,096 | 9/1968 | Bateman et al. | 260/42.47 X |
| 3,402,140 | 9/1968 | Bickel et al. | 260/38 |
| 3,438,918 | 4/1969 | Arlt et al. | 260/42.47 X |
| 3,470,127 | 9/1969 | Snell et al. | 260/42.47 X |
| 3,708,554 | 1/1973 | Oguri et al. | 260/33.6 AQ X |
| 3,816,358 | 6/1974 | Nordsiek et al. | 260/33.6 AQ X |
| 3,835,201 | 9/1974 | Fischer | 260/897 A |
| 3,919,358 | 11/1975 | Batiuk et al. | 260/42.47 X |

*Primary Examiner*—Lewis T. Jacobs
*Attorney, Agent, or Firm*—S. Michael Bender; Ken Richardson

[57] ABSTRACT

A thermoplastic elastomeric molding composition processable into a useable elastomeric article is formed by admixing a vulcanizable or otherwise thermosetable elastomeric polymer with suitable quantities of filler materials, plasticizers, and processing aids. The composition is then molded or otherwise formed, without undergoing vulcanization, into a useful elastomeric article by conventional thermoplastic forming techniques such as, for example, molding, extruding, etc.

29 Claims, No Drawings

THERMOPLASTIC ELASTOMERIC MOLDING COMPOSITION AND ARTICLES MOLDED THEREFROM

This is a continuation of application Ser. No. 635,698, filed Nov. 26, 1975, now abandoned.

RELATED APPLICATION

Cross-reference is made to U.S. application Ser. No. 635,697, filed Nov. 26, 1975, in the names of Louis J. Triolo and Donald F. Morgan, entitled PROCESS FOR MAKING THERMOPLASTIC ELASTOMERIC ARTICLES AND ARTICLES MOLDED THEREFROM.

BACKGROUND OF THE INVENTION

The present invention relates generally to molding compositions and, more particularly, to a thermoplastic elastomeric molding composition the primary polymeric constituent of which comprises a vulcanizable, or otherwise thermosetable elastomer of the ethylene propylene type sometimes referred to herein as an EPR elastomer.

The molding compositions disclosed herein are suitable for use in the fabrication of a wide variety of elastomeric products such as, for example, semi-pneumatic tires, belting, automotive bumper guards, door stops, rubber covered handles, snap-on-tread tires, hosing, electrical connector jackets and sheet material, all of which may be fabricated employing conventional thermoplastic forming techniques including, for example, injection molding, blow molding, compression molding, transfer molding and conventional extrusion techniques.

In recent years the use of thermoplastic elastomeric molding compositions has become increasingly widespread since such compositions may be molded to form useful elastomeric articles without requiring vulcanization as is the case with thermoset molding compositions. Articles molded from such thermoplastic elastomeric molding compositions frequently possess physical properties as good as if not superior to vulcanized elastomeric articles, and therefore the reduction in production time and expense resulting from elimination of the vulcanization step achieves a significant advantage.

Another advantage thermoplastic elastomeric molding compositions have over thermoset molding compositions is that they may be reprocessed without the necessity of first having to devulcanize them as is normally required when reprocessing articles molded from thermoset compositions.

Certain physical properties of thermoplastic elastomeric molding compositions are of particular importance when determining the desirability of a particular molding composition. The primary elastomeric polymeric cconstituent of the composition should have a high green strength and the resultant composition should have moderate viscosity and high nerve. Additionally, the cost of the particular composition should be competitive with comparable thermoset compositions. Above all, the physical properties of articles molded from thermoplastic molding compositions should compare favorably to the physical properties of comparable thermoset articles.

Against the foregoing background, it is a primary objective of the present invention to provide a thermoplastic elastomeric molding composition processable into a useful elastomeric article.

It is another object of the present invention to provide a thermoplastic elastomeric molding composition, the primary elastomeric polymeric ingredient of which is a sulfurcurable thermosetable compound.

It is another object of the present invention to provide a thermoplastic elastomeric molding composition having moderate viscosity, high nerve and which includes a polymeric ingredient having high green strength.

It is an additional object of the present invention to provide a thermoplastic elastomeric molding composition processable into a useful article, the physical properties of which equal or exceed those of articles produced from thermosetable elastomeric molding compositions which have undergone vulcanization.

It is still another object of the present invention to provide a thermoplastic elastomeric molding composition processable into a useful article which is less expensive than similar articles molded from a thermosetable elastomeric molding composition which has undergone vulcanization.

It is yet still another object of the present invention to provide a novel process for forming a useful elastomeric article.

SUMMARY OF THE PRESENT INVENTION

To the establishment of these additional objects and advantages, the present invention briefly comprises a thermoplastic elastomeric molding composition processable into a thermoplastic elastomeric article wherein the primary ingredient of the composition comprises an elastomeric polymer of the EPR type, preferably an EPDM terpolymer in which the ethylene content is in the range from about 65% to about 85% by weight of the total elastomeric polymer and the diene content of which is no greater than about 4% of the total elastomeric polymer. The composition of the invention preferably also comprises a plasticizer, inert filler materials and processing aids, with the elastomeric polymer comprising an amount in the range from about 20% to about 50% by weight of the total composition; the inert filler materials comprising up to about 60% by weight of the total composition; the plasticizer comprising an amount in the range from about 5% to about 30% by weight of the total composition; and the processing aids comprising up to about 10% by weight of the total composition. The composition of the invention is formed by admixing the above ingredients in a Banbury mixer at a temperature in the range from about 290° F. to about 370° F. The order in which the ingredients are added to the Banbury is dependent upon the amount of filler material present in the composition, i.e., upside down mixing is used when the filler material is more than about 50% by weight of the composition and conventional mixing is used when the filler material comprises less than about 50% by weight.

DESCRIPTION OF THE PREFERRED EMBODIMENTS

As previously stated, the present invention contemplates a thermoplastic elastomeric composition processable into a useful elastomeric article, the physical properties of which compare favorably to those of elastomeric articles produced from thermosetable polymeric molding compositions. The thermoplastic elastomeric molding composition herein disclosed is composed of the following ingredients:

(1) an elastomeric polymeric material capable of being molded as a thermoplastic, i.e., without being vulcanized;

(2) a blend of filler materials;

(3) a plasticizer; and (4) processing aids.

The elastomeric polymeric ingredient employed comprises a vulcanizable or otherwise thermosetable elastomeric polymer of the ethylene/propylene type usually referred to as EPR. Any reference to the term EPR as used herein and in the appended claims shall be construed to mean ethylene/propylene rubber and it is intended to embrace the entire class of ethylene/propylene elastomers including terpolymers (EPDM) and copolymers (EPM). A complete description of the chemical structure, physical characteristics, and methods of making such EPR polymers is contained in Chapter 9—ETHYLENE/PROPYLENE RUBBER of Rubber Technology, second edition, published 1973 by Van Nostrand Reinhold Company, pages 220-248, which is incorporated herein by this reference.

Preferably, the EPR polymeric ingredient is a terpolymer (EPDM) having a viscosity in the range of from about 50 to about 85 Mooney, the diene content of which is no greater than about 4% by weight of the total elastomer and the ethylene content of which is in the range from about 65% to about 85% by weight of the total elastomer. Additionally, the elastomeric polymer selected should be highly resilient at room temperature. A particularly preferred elastomeric polymer is a vulcanizable elastomeric terpolymer of ethylene, propylene and nonconjugated diene, the viscosity of which is about 80 Mooney, the ethylene content of which is about 70% by weight of the total elastomer and the diene content of which is about 4% by weight of the total elastomer. An example of such terpolymer is the terpolymer marketed by the B. F. Goodrich Chemical Company under the trademark Epcar 847. Epcar 847 is a sulfur-curable, elastomeric terpolymer which, heretofore had been considered a thermoset material for use, in particular, as an additive to thermoset polymers to increase the green strength thereof.

The elastomeric polymer or polymers selected may comprise an amount in the range from about 20% to about 80% by weight of the total composition with an amount in the range from about 20% to about 50% by weight of the total composition being preferred. The latter narrower range permits the addition of greater quantities of filler materials, thus reducing the cost of the molding composition. More restrictive or broader ranges of elastomeric polymer would depend upon the article or articles to be molded. For example, when the article to be molded is a semipneumatic tire, a preferred amount of the elastomeric polymer is in the range from about 24% to about 30% by weight of the entire composition.

A preferred amount of the elastomeric polymer in compositions for molding flexible articles such as, for example, flexible hose, is generally in the range from about 20% to about 35% by weight of the total composition. When the article to be molded must be somewhat electrically conductive such as, for example, when the molded article is to be used as the insulative or semiconductive jacket of a high-voltage electrical connector, a preferred amount of the elastomeric polymer would be in the range from about 40% to about 50% by weight of the total composition.

In order to reduce the cost of the article molded from the composition of the present invention without significantly affecting its physical properties, it is preferred that certain filler materials or a combination of filler materials be admixed with the elastomeric polymeric ingredient. While most conventional system-compatible filler materials may be employed, it is preferred that the filler material or combination of filler materials be selected from the group consisting of carbon black, coal dust, clays, whiting, silica, phenolic resins, coloring pigments, polyolefins, hard hydrocarbon bituminous petrolem, and nonconductive fillers. Filler materials may comprise up to about 60% by weight of the total composition.

The presence of carbon black in the molding composition, in addition to reducing the amount of the elastomeric polymer required and aiding in the processability of the molding composition, also produces a much stronger molded article. A preferred type of carbon black is a nonconductive, fast extruding furnace black N-550 FEF such as, for example, the carbon black marketed by Cabot Corporation under the trademark Sterling 50. In those instances where the resultant article must have electrically conductive properties, a conductive carbon black may preferably be used. Preferred conductive carbon blacks include the products marketed by the Cabot Corporation under the designations Vulcan SC, Vulcan C and Vulcan XC-72.

Carbon black may constitute up to about 40% by weight of the total composition. When a nonconductive carbon black is included in the composition, it may be added in an amount in the range from about 10% to about 28% by weight of the total composition. When, however, an electrically conductive carbon black is included, it may be added in an amount in the range from about 15% to about 30% by weight of the total composition.

Coal dust may also be included as an inexpensive filler material and its presence in the composition slightly improves the resiliency of the molded article. Coal dusts which are satisfactory include austin black, which is a bituminous coal, and ground anthracite coal dust. A preferred coal dust is the ground anthracite coal marketed by Shamokin Filler Company, Inc. under the trademark Carb-o-fil 325. Coal dust may constitute up to about 10% by weight of the total composition, although an amount in the range of from about 5% to about 8% by weight of the total composition is preferred.

Another inexpensive filler material which may be added to reduce the amount of elastomeric polymer required and to increase the stiffness and hardness of the resultant article is clay, preferably hydrated aluminum silicate. Particularly preferred clays include the hydrated aluminum silicates marketed under the trademarks Apex by Thompson, Weinman & Co,; Bardner by J. M. Huber Corp. and Dixieclay by R. T. Vanderbilt Company. Also preferred is the kaolin clay marketed by J. M. Huber Corp. under the trademark Suprex. The anhydrous aluminum silicate marketed by Burgess under the designation Burgess KE is particularly preferred especially in those instances where the resultant article is to be nonconductive.

Clay may be present in the composition in an amount up to about 25% by weight of the total composition although a preferred range is dependent upon the article to be molded. For example, in compositions molded into semipneumatic tires or flexible hose, a preferred amount of clay is in the range from about 5% to about 10% by weight of the total composition. When, however, the composition is to be molded into articles requiring greater rigidity such as, for example, high voltage electrical connector jackets, the inclusion of clay or clays in amounts ranging from about 15% to about 20% by weight of the total composition is preferred.

Ground calcium carbonate or whiting is another low-cost filler material which may be employed. The addition of calcium carbonate to the molding composition results in increasing the hardness of the resultant molded article though generally it requires greater amounts of calcium carbonate to achieve the same degree of stiffness and hardness achieved by the use of, for example, a clay filler. Calcium carbonate may also be used as a white pigment in those instances when a light colored article is desired. Particularly preferred types of calcium carbonate include the calcium carbonate marketed by Georgia Marble Co. under the designations No. 9 and No. 10 White and the anhydrous calcium carbonate marketed by United States Gypsum Company under the trademark Snow Flake White. While calcium carbonate may comprise up to about 25% by weight of the total composition, a preferred amount is in the range of from about 12% to about 22% by weight of the total composition.

Silicas are characterized as moderate cost filler materials, the addition of which improves the extrusion properties of the molding composition, and serves to increase the hardness, tear strength, tensile strength and resiliency of the resultant molded article. Preferred silica fillers are the hydrated silicas marketed by PPG Industries, Inc. under the trademarks Hi Sil EP, Hi Sil 233 and Silene D and by Union Carbide under the designation UNCAR Silica. Silica may comprise up to about 15% by weight of the total molding composition with a preferred amount being in the range from about 8% to about 12% by weight of the total composition.

Thermoset phenolic hardening resins may also be added to the molding composition both as a filler material and to improve the heat stability of the resultant molded article. Additionally, phenolic resins serve to improve the stiffness of the composition, thus making processing easier. While both reactive and nonreactive phenolic resins may be used, the nonreactive variety, which lacks hexamethylene tetramine, is preferred. Preferred phenolic resins of the nonreactive type include the phenolic resin marketed by Union Carbide under the designation BRPA-8081 and the phenolic resins marketed by Polymer Applications, Inc. under the designations PA-052, PA-070 and PA-055, the latter being modified with cashew nut oil to increase its compatability with other molding composition ingredients. A particularly preferred reactive type of phenolic resin is marketed by Union Carbide under the designation BRPA-4494. Phenolic resins may be included in the molding composition in an amount up to about 10% by weight of the total composition although a preferred amount is in the range from about 3% to about 7% by weight of the total composition.

Thermoplastic filler materials, preferably belonging to the polyolefin class or group, may also be included. The addition of thermoplastic filler materials serves to increase the tensile strength of the resultant molded article, although, generally at the expense of its elongation. Additionally, a thermoplastic filler material which is generally added to increase the heat distortion point of the resultant molded article. Examples of Thermoplastic filler materials may be selected from the polyolefin group are, polypropylenes and high molecular weight polyethylenes. Additionally, the acrylnitrilebutadiene styrenes and styrene acrylnitriles marketed by Borg-Warner Corp. under the trademarks Blendex 701 and Blendex 565, respectively, may be used. A preferred thermoplastic filler material is polypropylene and preferred polypropylenes include those polypropylenes marketed by Shell Chemical Company and Rexene Polymers Company. Thermoplastic filler materials may be included in an amount up to about 5% by weight of the total molding composition with a preferred amount being in the range from about 0.5% to about 4% by weight of the total composition. Notably, it is to be fully understood that the addition of thermoplastic filler materials belonging to the polyolefin group to the blend of filler materials and thus, to the EPR polymeric ingredient is optional. For polyolefin thermoplastic filler ingredients are in no way essential, as an additive within the blend of filler materials, where elongation properties are not to be sacrificied for the gain or increased tensile strength properties and/or increased heat distortion point properties in the resultant molded article.

The use of mineral rubber or hard hydrocarbon bituminous petroleum may also be used as a filler material particularly to increase the hardness and stiffness of the article molded from the composition as well as improving the processability of the molding composition. Preferred grades of mineral rubber are marketed by C. P. Hall Company and R. T. Vanderbilt Company. Mineral rubber may be included in the molding composition in an amount up to about 15% by weight of the total composition with an amount in the range from about 5% to about 12% by weight of the total composition being preferred.

In those instances where the article to be fabricated is to be electrically insulative, it is advantageous to include in the molding composition a filler material having a relatively high dielectric strength such as, for example, anhydrous aluminum silicate. Particularly preferred anhydrous aluminum silicates are marketed by Burgess Pigment Company under the trademarks Iceberg and Icecap K. Such high dielectric strength filler material may be included in the composition in amounts up to about 35% by weight of the composition and, when added, an amount in the range of from about 20% to about 35% by weight of the total composition is preferred.

The addition of a plasticizer improves the processability of the composition and the elongation properties of the resultant molded article although it does decrease the viscosity of the composition and the tensile strength of the resultant molded article. Additionally, since a plasticizer tends to reduce the brittleness of the resultant molded article, it serves to improve the article's low temperature properties. While any system compatible resin plasticizer may be employed, it is preferred that a plasticizer selected from the group consisting of naphthenic oil, paraffinic oil, aromatic oil, dibutyl phthalate and dioctyl phthalate be used. Preferred grades of naphthenic oil are marketed by Sun Chemical Corporation under the designations Circosol 410, Circosol 450, Circosol 4130 and Circosol 4240. Particularly preferred types of paraffinic oil are sold by Sun Chemical Corporation under the trademarks Sunpar 2280 and Sunpar 150. Preferred aromatic oils are marketed by Sun Chemical Corporation under the marks Sundex 750, Sundex 790, Sundex 890, Sundex 4120 and Sundex 8225. Preferred grades of dibutyl phthalate are marketed generically by Union Carbide and ARCO Chemical Co. and preferred grades of dioctyl phthalate are marketed by FMC Corporation and W. R. Grace & Co., Hatco Chemical Division.

The amount of plasticizer added to the molding composition is dependent upon the other ingredients comprising the molding composition as well as upon the intended end use of the resultant article. Generally, the plasticizer should comprise an amount in the range from about 5% to about 30% by weight of the total composition, with an amount of plasticizer in the range from about 15% to about 25% by weight being preferred.

Processing aids added to the composition may include, for example, coloring pigments, anti-oxidants, internal lubricants and tackifiers. Coloring pigments such as, for example, titanium dioxide and iron oxide, may be added to the composition in amounts necessary to effect an article of a desired color. A preferred titanium dioxide pigment is marketed by N L Industries, Inc. under the trademark Titanox. Coloring pigments may be included in the composition in amounts up to about 5% by weight of the total composition.

Anti-oxidants are generally added to the composition to increase the life of the resultant molded article. While virtually any conventional anti-oxidant may be added including, for example, amine, phenolic, sulfide, phenyl alkaline, and phosphite type anti-oxidants, a preferred anti-oxidant is polymerized 1, 2 dihydro—2, 2, 4 trimethyl quinoline such as, for example, the trimethyl quinoline marketed by R. T. Vanderbilt Corp. under the trademark Age Rite Resin D. Anti-oxidants may be included in the molding composition of the present invention in amounts up to about 1% by weight of the total composition with a preferred amount being in the range from about 0.2% to about 0.6% by weight of the total composition.

An internal lubricant or blend of internal lubricants may be included as a processing aid, particularly to improve the extrusion properties of the composition. Further, an internal lubricant or blend of internal lubricants function as a mold release agent. While any system-compatible internal lubricant may be used, both paraffinic wax and a low molecular weight polyethylene wax are preferred, either singularly or in combination. A preferred paraffinic wax is marketed by City Chemical, the melting point of which is between about 140° F. and about 150° F. Preferred low molecular weight polyethylene waxes are marketed by Union Carbide under the designation DFDA-0053 and by Allied Chemical under the designation AC Poly. An internal lubricant or blend of internal lubricants may be added to the composition in an amount up to about 3% by weight of the total composition with a preferred amount being in the range from about 0.5% to about 3% by weight of the total composition.

Still another processing aid which may be included in the molding composition is a tackifying agent, preferably a nonreactive type tackifier. The presence of a tackifying agent serves to improve the ability of the composition to adhere to itself, thus improving processability of the composition. A preferred tackifying agent is a high melting point, thermoplastic, alkyl phenol-formaldehyde resin such as, for example, the alkyl phenol-formaldehyde resin marketed by Polymer Applications under the designation PA-50-009. When added to the composition, a tackifying agent may be added in amounts up to about 1% by weight of the total composition with a preferred amount ranging between about 0.2% and about 1% by weight of the total composition.

In addition to the foregoing ingredients, it will be apparent to those skilled in the art that a variety of other ingredients may be employed which do not affect the essential nature of the resultant molded article. Indeed, many such ingredients may be provided for the purpose of improving industrial acceptance.

While any mixing or blending apparatus capable of uniformly dispersing the aforementioned ingredients may be readily utilized, it is preferred that a conventional Banbury mixing device or other internal mixing device by employed.

The order in which the aforementioned ingredients are added to form the molding composition is dependent upon the amount of filler material included in the molding composition. In those instances where the percentage of filler materials is in excess of about 50% by weight of the total weight of the composition, the filler materials, plasticizers and processing aids are first admixed in the Banbury followed by the addition of the elastomeric polymeric ingredient. This type of mixing is generally referred to in the art as up-side down mixing.

When, however, the percentage of filler materials is less than about 50% by weight of the total composition, it is preferred that the elastomeric polymeric ingredient be first added to the Banbury and thoroughly masticated prior to the addition of the filler material, plasticizer and processing aids. This procedure is referred to in the art as conventional mixing.

In either case, the Banbury should be maintained at a temperature in the range from about 290° F. to about 370° F. with a temperature of about 325° F. being preferred.

The resultant composition, after admixture in the Banbury, may be processed into a wide variety of elastomeric articles by such thermoplastic fabricating or forming techniques as, for example, injection molding, blow molding, compression molding, transfer molding, extrusion, and so on.

The following examples serve to illustrate certain preferred embodiments of the present composition and process for compounding same and are not to be construed as limiting the present invention:

EXAMPLE I

A molding composition suitable for making an elastomeric semi-pneumatic tire was prepared comprising the following ingredients with their respective amounts being specified as a percentage weight of the total weight of the composition:

| Ingredients | Percentage by Weight |
| --- | --- |
| EPDM terpolymer | 27.4% |
| N-550 FEF carbon black | 16.4% |
| anthracite coal dust | 6.8% |
| calcium carbonate | 19.2% |
| hydrated silica | 9.6% |
| naphthenic oil | 17.8% |
| polymerized 1, 2 dihydro 2, 2, 4 trimethyl quinoline | 0.3% |
| paraffinic wax | 1.4% |
| polyethylene wax | 1.4% |

The aforementioned ingredients were added to a Banbury mixer in the following order: EPDM terpolymer, filler materials, plasticizers and processing aids. The ingredients were then admixed in the Banbury mixer at a temperature of about 325° F. The resulting molding composition was then extruded at a temperature of about 325° F. into a cylindrically shaped tubular structure which was then molded in the manner set forth in detail in the aforementioned copending application, Ser. No. 635,697, filed on Nov. 26, 1975, to form a semi-pneumatic tire. The resultant molded article in the form of a semi-pneumatic tire exhibited the following physical properties:

| Tensile Strength | 700 psi |
|---|---|
| Elongation | 565% |
| Modulus 100% | 370 psi |
| Modulus 200% | 580 psi |
| Crescent Tear Strength | 265 |
| Hardness (Shore A) | 75 |
| Specific Gravity | 1.2 |

The foregoing physical properties are comparable to the physical properties of commercially acceptable thermoset tires.

EXAMPLE II

In order to demonstrate the effect of practicing the instant invention with a different combination or blend of filler materials, particularly where austin black was used as a filler material, and where the constituent ingredients were admixed in a different manner, a molding composition suitable for making an elastomeric semi-pneumatic tire was prepared comprising the following ingredients in the following percentages:

| Ingredients | Percentage by Weight |
|---|---|
| EPDM terpolymer | 25.7% |
| N-550 FEF carbon black | 18.0% |
| austin black | 7.7% |
| calcium carbonate | 20.6% |
| hydrated silica | 9.0% |
| naphthenic oil | 16.7% |
| polymerized 1, 2 dihydro 2, 2 4 trimethyl quinoline | 0.3% |
| paraffinic wax | 1.3% |
| polyethylene wax | 0.8% |

The resultant molding composition was fabricated into a semi-pneumatic tire in the same manner as the composition of Example I except that during the formation of the molding composition the EPDM terpolymer ingredient was added to the Banbury mixer subsequent to the addition of the filler material, processing aids and plasticizer. The resultant molded tire exhibited the following physical properties:

| Tensile Strength | 614 psi |
|---|---|
| Elongation | 713% |
| Modulus 200% | 296 psi |
| Modulus 300% | 375 psi |
| Crescent Tear Strength | 160 |
| Hardness (Shore A) | 72 |
| Specific Gravity | 1.245 |

It will be noted that the physical properties of the molded semi-pneumatic tire of this Example are similar to the properties of the molded tire of Example I and are considered generally commercially acceptable. While the tensile strength of the molded tire of this Example measured lower than the tensile strength of the molded tire of Example I, the elongation of the former is significantly higher than that of the latter indicating that an elastomeric article with greater flexibility may be produced using the composition of this example.

EXAMPLE III

In order to illustrate the preparation of a thermoplastic molding composition suitable for fabrication into elastomeric hose in accordance with the principles of the present invention, a molding composition was prepared comprising the following ingredients in the following percentages:

| Ingredients | Percentage by Weight |
|---|---|
| EPDM terpolymer | 26.0% |
| N-550 FEF carbon black | 15.8% |
| anthracite coal dust | 6.6% |
| calcium carbonate | 18.5% |
| hydrated silica | 9.2% |
| naphthenic oil | 17.1% |
| polymerized 1, 2 dihydro 2, 2 4 trimethyl quinoline | 0.3% |
| paraffinic wax | 0.8% |
| polyethylene wax | 1.3% |
| polypropylene | 4.0% |

The foregoing ingredients were admixed in a Banbury mixer in the same manner as in Example I and the resulting molding composition was extruded in a hot feed, long screw extruder at a temperature of about 300° F. into elastomeric hose exhibiting the following physical properties:

| Tensile Strength | 1144 psi |
|---|---|
| Elongation | 133% |
| Modulus 100% | 915 psi |
| Crescent Tear | 94 |
| Specific Gravity | 1.35 |

The foregoing properties of the resultant extruded hose are indicative of commercially acceptable elastomeric hose.

EXAMPLE IV

In order to illustrate the preparation of a thermoplastic molding composition suitable for fabricating elastomeric hose with superior elongation properties, a molding composition was prepared employing the same procedure as set forth in Example I, said composition comprising the following ingredients in the following percentages:

| Ingredients | Percentage by Weight |
|---|---|
| EPDM terpolymer | 29.5% |
| N-550 FEF carbon black | 17.7% |
| N-660 carbon black | 4.4% |
| anthracite coal dust | 11.8% |
| hydrated silica | 10.3% |
| naphthenic oil | 20.6% |
| polymerized 1, 2 dihydro 2, 2 4 trimethyl quinoline | 0.6% |
| phenolic resin | 2.9% |
| paraffin wax | 0.9% |
| polyethylene wax | 1.2% |

The resultant molding composition was fabricated into elastomeric hose in the same manner as in Example III and the resultant hose exhibited the following physical properties:

| Tensile Strength | 580 psi |
|---|---|
| Elongation | 750% |

| | |
|---|---|
| Modulus 100% | 235 psi |
| Crescent Tear | 129 |
| Specific Gravity | 1.17% |

The foregoing measured physical properties indicate that by slightly increasing the amount of the EPDM terpolymer ingredient and by replacing the calcium carbonate and polypropylene with an increased amount of carbon black, coal dust and naphthenic oil, the elongation of the resultant molded article may be greatly increased although its tensile strength will somewhat be decreased.

EXAMPLE V

In order to illustrate the preparation of a thermoplastic molding composition suitable for fabrication into elastomeric hose with superior elongation properties and high tensile strength, a molding composition was prepared according to the procedures as set forth in Example IV wherein the following ingredients in the following percentages were admixed in the Banbury mixer:

| Ingredients | Percentage by Weight |
|---|---|
| EPDM terpolymer | 27.7% |
| N-550 FEF carbon black | 6.9% |
| N-339 HAF carbon black | 20.8% |
| hard clay | 6.9% |
| hydrated silica | 9.7% |
| naphthenic oil | 24.9% |
| polymerized 1, 2 dihydro 2, 2 4 trimethyl quinoline | 0.6% |
| paraffin wax | 0.8% |
| polyethylene wax | 1.7% |

The resultant molding composition was fabricated into elastomeric hose in the same manner as in Example IV and exhibited the following physical properties:

| | |
|---|---|
| Tensile Strength | 720 psi |
| Elongation | 1000% |
| Modulus 200% | 235 psi |
| Modulus 300% | 291 psi |
| Crescent Tear | 129 |
| Specific Gravity | 1.139 |

The foregoing measured physical properties indicate elastomeric hose having excellent strength and superior elongation. This is due in part to the presence of hard clay in the composition which imparted strength to the resulting molded article and to the greater amount of naphthenic oil in the composition which tends to increase the elongation of the resulting molded article.

EXAMPLE VI

In order to illustrate the preparation of a thermoplastic molding composition suitable for fabrication into an electrically conductive elastomeric jacket for use in connection with a high-voltage electrical connector, a molding composition was prepared according to the procedures as set forth in Example I wherein the following ingredients in the following percentages were admixed in the Banbury mixer:

| Ingredients | Percentage by Weight |
|---|---|
| EPDM terpolymer | 49.1% |
| Vulcan XC carbon black | 12.3% |
| Vulcan SC carbon black | 12.3% |
| polyethylene wax | 1.5% |
| paraffinic wax | 1.5% |
| naphthenic oil | 19.7% |
| phenolic resin | 3.7% |

The resultant molding composition was then molded into sheet form at a temperature of about 300° F. and exhibited the following physical properties:

| | |
|---|---|
| Tensile Strength | 1526 psi |
| Elongation | 970% |
| Modulus 200% | 272 psi |
| Modulus 300% | 325 psi |
| Hardness (Shore A) | 69 |
| Crescent Tear | 201 |
| Compression 158° at 72 hrs. | 104.3 |
| Specific Gravity | 1.015 |

The physical properties exhibited by the molded sheet indicate that the molding composition could easily be formed into an article such as, for example, an electrical connector jacket due principally to its strength and elongation and the presence of the conductive carbon black filler materials.

Although the foregoing Examples illustrate the formation of certain thermoplastic elastomeric articles from the present molding composition, it will be appreciated that the present molding composition may have additional applications such as, for example, the formation of automotive bumper guards, door stops, rubber covered handles, etc. Accordingly, the present invention should be limited only by the scope of the appended claims.

Wherefore I claim:

1. A thermoplastic molding composition processable into a useful elastomeric article, said composition consisting essentially of:
   (a) a vulcanizable EPDM elastomeric terpolymer in an amount within the range from about 26% to about 49% by weight of the total composition, wherein said EPDM terpolymer has an ethylene content within the range of from about 65% to about 85% by weight of the total terpolymer, and a diene content within the range of up to about 4% by weight of said total terpolymer;
   (b) an inert filler free from polyolefins in an amount within the range of from about 25% to about 55% by weight of said total composition, said filler consisting of a blend of at least two different filler materials, said blend of at least two different filler materials being selected from the group consisting of carbon black, coal dust, clay, calcium carbonate, silica, thermoplastic phenolic resin and non-conductive fillers; and
   (c) the remainder of the composition being made up of suitable quantities of a plasticizer and processing aids.

2. The composition of claim 1 wherein said blend of inert filler materials includes carbon black in an amount within the range of up to about 25% by weight of the total composition.

3. The composition of claim 1 wherein said blend of inert filler materials includes carbon coal dust in an amount within the range of up to about 12% by weight of the total composition.

4. The composition of claim 3 wherein said coal dust is austin black in an amount of about 8% by weight of the total composition.

5. The composition of claim 3 wherein said coal dust is anthracite coal in an amount within the range from about 7% to about 12% by weight of the total composition.

6. The composition of claim 1 wherein said blend of inert filler materials includes clay in an amount within the range of up to about 25% by weight of the total composition.

7. The composition of claim 6 wherein said clay is hydrated aluminum silicate in an amount within the range from about 9% to about 10% by weight of the total composition and hard clay in an amount of about 7% by weight of the total composition.

8. The composition of claim 1 wherein said blend of inert filler material includes calcium carbonate in an amount within the range of up to about 25% by weight of the total compostion.

9. The composition of claim 1 wherein said blend of inert filler materials includes silica in an amount within the range of up to about 10% by weight of the total composition.

10. The composition of claim 1 wherein said blend of inert filler materials includes a thermoplastic phenolic resin in an amount within the range of up to about 4% by weight of the total composition.

11. The composition of claim 1 wherein said blend of inert filler materials includes a nonconductive filler material in an amount within the range of up to about 25% by weight of the total composition.

12. The composition of claim 10 wherein said nonconductive filler material is anhydrous aluminum silicate in an amount within the range from about 9% to about 10% by weight of the total composition.

13. The composition of claim 11 wherein said plasticizer is included in an amount within the range of from about 18% to about 25% by weight of the total composition.

14. The composition of claim 12 wherein said plasticizer is naphthenic oil.

15. The composition of claim 1 wherein said processing aids comprise a blend of processing aids.

16. The composition of claim 15 wherein said blend of processing aids are selected from the group consisting of antioxidants and lubricants.

17. The composition of claim 16 wherein said blend of processing aids includes at least one anti-oxidant and wherein said anti-oxidant is included in an amount in the range of up to about 1% by weight of the total composition.

18. The composition of claim 17 wherein at least one anti-oxidant is polymerized 1, 2 dihydro 2, 2, 4 trimethyl quinoline.

19. The composition of claim 16 wherein said blend of processing aids include at least one lubricant selected from the group consisting of paraffinic wax and low molecular weight polyethylene wax and wherein said at least one lubricant is included in an amount in the range of up to about 3% by weight of the total compositon.

20. The article molded from the composition of claim 1.

21. A method for making a useful elastomeric article comprising the steps of:
(a) forming a molding composition by admixing ingredients consisting essentially of the following:
(i) a vulcanizable elastomeric EPDM terpolymer in an amount within the range from 26% to about 49% by weight of the total composition;
(ii) an inert filler free from polyolefins in an amount within the range from about 25% to about 55% by weight of the total composition, said filler consisting of a blend of at least two different filler materials, said blend of at least two different filler materials being selected from the group consisting of carbon black, coal dust, clay, calcium carbonate, silica, thermoplastic phenolic resin and non-conductive fillers, the remainder of ingredients being made up of suitable quantities of plasticizer processing aids; and
(b) thermoplastically forming said composition into said useful article.

22. The method of claim 20 wherein said step of admixing comprises mixing said ingredients together in an internal mixer at a temperature in the range of about 290° F. to about 370° F.

23. The method of claim 20 wherein said step of thermoplastically forming said composition into said useful article comprises molding said composition without vulcanizing said composition.

24. The article made by the method of claim 20.

25. The article of claim 24 comprising hose.

26. The article of claim 24 comprising a housing for a high-voltage connector.

27. A useful, thermoplastic, elastomeric molded article, said article consisting essentially of a nonvulcanized, vulcanizable EPDM elastomeric terpolymer in an amount within the range from about 26% to about 49% by weight of the total compositon and an inert filler in an amount within the range of from about 25% to about 55%, said filler comprising a blend of different filler materials, said filler blend being dispersed throughout said terpolymer wherein said EPDM terpolymer has an ethylene content within the range of from about 65% to about 85% by weight of the total terpolymer, a diene content within the range of up to about 4% by weight of the total terpolymer, and wherein said blend of filler mateial is free from polyolefins, said blend of filler materials consisting of a blend of at least two different filler ingredients selected from the group consisting of carbon black, coal dust, clay, calcium carbonate, silica, thermoplastic phenolic resin, and non-conductive fillers.

28. The composition of claim 27 wherein said EPDM terpolymer has an ethylene content of about 70% by weight of the total terpolymer, and wherein the viscosity of said terpolymer is about 80 Mooney.

29. A thermoplastic molding composition processable into a useful elastomeric article such as a semipneumatic tire, said composition consistng essentially of:
(a) a vulcanizable EPDM elastomeric terpolymer in an amount within the range from about 26% to about 28% by weight of the total composition, wherein said EPDM terpolymer has an ethylene content within the range of from about 65% to about 85% by weight of the total terpolymer, and a diene content within the range of up to about 4% by weight of said total terpolymer;
(b) an inert filler free from polyolefins in an amount within the range of from about 44% to about 52% by weight of said total composition, said filler consisting of a blend of at least three different filler materials, said blend of at least three different filler materials being selected from the group consisting of carbon black, coal dust, clay, calcium carbonate silica, thermoplastic phenolic resin and nonconductive fillers, said blend of at least three different filler materials including: carbon black in an amount within the range of up to about 25% by weight of the total composition;

coal dust in an amount within the range of up to about 12% by weight of the total composition; clay in an amount within the range of up to about 25% by weight of the total composition; calcium carbonate in an amount within the range of up to about 25% by weight of the total compositon;

silica in an amount within the range of up to about 10% by weight of the total composition; thermoplastic phenolic resin in an amount within the range of up to about 4% by weight of the total compositon; and a nonconductive filler material in an amount within the range from about 6% up to about 8% by weight of the total composition; and (c) the remainder of the composition being made up of suitable quantitites of a plasticizer and processing aids.

* * * * *

UNITED STATES PATENT AND TRADEMARK OFFICE
CERTIFICATE OF CORRECTION

PATENT NO. : 4,153,589
DATED : May 8, 1979
INVENTOR(S) : Louis J. Triolo

It is certified that error appears in the above-identified patent and that said Letters Patent are hereby corrected as shown below:

Column 14, line 17, change "20" to --21--; line 21, change "20" to --21--; line 25, change "20" to --21--; and line 48, change "composition" to --article--.

Signed and Sealed this

Eleventh Day of September 1979

[SEAL]

Attest:

Attesting Officer

LUTRELLE F. PARKER
Acting Commissioner of Patents and Trademarks